(12) United States Patent
Oya (10) Patent No.: US 8,607,843 B2
(45) Date of Patent: Dec. 17, 2013

(54) SUNSHADE DEVICE

(75) Inventor: Takeaki Oya, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/520,494

(22) PCT Filed: Jan. 19, 2011

(86) PCT No.: PCT/JP2011/050809
§ 371 (c)(1),
(2), (4) Date: Jul. 3, 2012

(87) PCT Pub. No.: WO2011/090042
PCT Pub. Date: Jul. 28, 2011

(65) Prior Publication Data
US 2012/0305204 A1    Dec. 6, 2012

(30) Foreign Application Priority Data

Jan. 20, 2010    (JP) ................... 2010-009894

(51) Int. Cl.
*B60J 3/00*    (2006.01)
(52) U.S. Cl.
USPC ..................... 160/306; 160/370.22
(58) Field of Classification Search
USPC ............. 160/306, 370.22, 294, 315; 296/97.8
See application file for complete search history.

(56) References Cited

U.S. PATENT DOCUMENTS

| 1,562,313 | A | * | 11/1925 | Duncan | 160/315 |
| 1,726,589 | A | * | 9/1929 | Schultes | 160/315 |
| 1,853,150 | A | * | 4/1932 | Schultes | 160/306 |
| 4,222,601 | A | * | 9/1980 | White et al. | 296/37.16 |
| 4,466,475 | A | * | 8/1984 | Saito et al. | 160/297 |
| 4,482,137 | A | * | 11/1984 | Gavagan et al. | 267/157 |
| 5,031,682 | A | * | 7/1991 | Tedeschi | 160/315 |

(Continued)

FOREIGN PATENT DOCUMENTS

| DE | 196 40 846 | 4/1998 |
| JP | 55 55030 | 4/1980 |
| JP | 57 188545 | 11/1982 |
| JP | 2003 211957 | 7/2003 |

OTHER PUBLICATIONS

International Preliminary Report on Patentability issued Aug. 16, 2012 in PCT/JP2011/050809 filed Jan. 19, 2011.

(Continued)

*Primary Examiner* — David Purol
(74) *Attorney, Agent, or Firm* — Oblon, Spivak, McClelland, Maier & Neustadt, L.L.P.

(57) ABSTRACT

A sunshade device including: a sunshade; a stay to which one edge of the sunshade is fixed; a windup shaft to which the other edge of the sunshade is fixed; a first support member supporting one end of the windup shaft to rotate relative thereto and move relative thereto in a longitudinal direction of the windup shaft, and mounted at a vehicle; a second support member supporting the other end of the windup shaft to rotate relative thereto and move relative thereto in the longitudinal direction of the windup shaft, and mounted at the vehicle; and a biasing member configured to pivotally bias the windup shaft against the second support member. The windup shaft includes a restricted portion at the other end thereof, and the second support member includes a rotation restricting portion and a rotation releasing portion formed to be adjacent to each other.

4 Claims, 6 Drawing Sheets

(56) References Cited

U.S. PATENT DOCUMENTS

| | | | | |
|---|---|---|---|---|
| 5,464,052 | A | * | 11/1995 | Wieczorek et al. .......... 160/23.1 |
| 5,676,415 | A | * | 10/1997 | Ament et al. .............. 296/37.16 |
| 6,131,642 | A | * | 10/2000 | Welfonder .................... 160/301 |
| 7,082,983 | B2 | * | 8/2006 | Coulibaly et al. ............ 160/306 |
| 7,147,030 | B2 | * | 12/2006 | Dalle Nogare et al. ....... 160/315 |
| 7,694,712 | B2 | * | 4/2010 | Schimko et al. ............. 160/315 |
| 2003/0131953 | A1 | | 7/2003 | Coulibaly et al. |

OTHER PUBLICATIONS

Written Opinion issued Apr. 19, 2011 in PCT/JP2011/050809 filed Jan. 19, 2011 (with English-language translation).
International Search Report Issued Apr. 19, 2011 in PCT/JP11/050809 Filed Jan. 19, 2011.
Notification of Reason(s) for Refusal issued Aug. 13, 2013 in Japanese Patent Application No. 2010-009894 (with partial English translation).

* cited by examiner

SUNSHADE DEVICE

TECHNICAL FIELD

The present invention relates to the technology of shading a vehicle window by a sunshade.

BACKGROUND ART

A sunshade device that shades a vehicle window is required to pivotally bias a windup shaft in a used sate after being installed in a vehicle such that a windup device has a windup force for winding up a sunshade. Accordingly, in a case of installing the sunshade device to a vehicle, the windup shaft and a bearing portion thereof are rotated relative to each other by a predetermined amount, to thereby provide a biasing force to a biasing member disposed therebetween. However, the process efficiency is poor in the process of providing a biasing force to a biasing member each time a sunshade device is installed to a vehicle.

Therefore, there is the technology disclosed in Patent Document 1 as the technology of providing a biasing force to a biasing member before the installation of a sunshade device to a car body to maintain a biasing state. The invention of Patent Document 1 is configured to prevent the rotation of a bearing bush inserted into and fixed to an end of a windup shaft and the rotation of a bearing element provided so as to rotate relative to the bearing bush, to which the other end of a helical spring whose one end is fixed into the inside of the windup shaft is fixed, to thereby maintain a biasing state of the helical spring. More specifically, arc-shaped anti-rotation ratchets formed in the bearing element so as to surround an outer periphery of the bearing bush are engaged with detent pockets formed on the outer periphery (collar) of the bearing bush, with the tips of the anti-rotation ratchets elastically deforming toward an inside in a radial direction, to thereby prevent the windup shaft from rotating relative to the bearing element.

PRIOR ART DOCUMENT

Patent Document

Patent Document 1: Japanese Patent Application Laid-Open No. 2003-211957

SUMMARY OF THE INVENTION

Problem to be Solved by the Invention

Unfortunately, according to Patent Document 1, in the state in which the windup shaft is prevented from rotating relative to the bearing element (biased state of a helical spring), the anti-rotation ratchets to elastically return to an original shape are maintained in the state of being engaged with the detent pockets by the biasing force of the helical spring and the shapes of the detent pockets. For this reason, in Patent Document 1, the anti-rotation ratchets may become detached from the detent pockets due to, for example, an external impact when the device is transported or the device is installed to a vehicle, and the anchored state may be released, causing a fear that the biasing state of the biasing member may be released.

Therefore, an object of the present invention is to maintain the biasing state of a biasing member more reliably.

Means to Solve the Problem

A first aspect relates to a sunshade device for shading a window of a vehicle, which includes: a sunshade; a stay to which one edge of the sunshade is fixed; a hollow windup shaft to which the other edge of the sunshade is fixed; a first support member supporting one end of the windup shaft to rotate relative thereto and move relative thereto in a longitudinal direction of the windup shaft, and mounted at a predetermined position of the vehicle; a second support member supporting the other end of the windup shaft to rotate relative thereto and move relative thereto in the longitudinal direction of the windup shaft, and mounted at another predetermined position of the vehicle; and a biasing member configured to pivotally bias the windup shaft against the second support member in the windup direction of the sunshade, wherein: the windup shaft includes a restricted portion at the other end thereof; the second support member includes a rotation restricting portion and a rotation releasing portion formed to be adjacent to each other in the longitudinal direction of the windup shaft, the rotation restricting portion restricting the operation of the restricted portion so as not to allow the rotation of the windup shaft relative thereto, the rotation releasing portion releasing the operation of the restricted portion so as to allow the rotation of the windup shaft relative thereto; and the windup shaft moves relative to the second support member in the longitudinal direction to restrict or release the rotation of the windup shaft.

According to a second aspect, in the sunshade device of the first aspect, the restricted portion is configured to move, upon the windup shaft rotating relative to the second support member, between the rotation releasing portion and the rotation restricting portion relative thereto.

According to a third aspect, in the sunshade device of the first or second aspect, the restricted portion is configured so as to move from the rotation restricting portion to the rotation releasing portion relative thereto by an operation of drawing the sunshade.

According to a fourth aspect, in the sunshade device of any one of the first to third aspects: the second support member is configured such that a spindle portion and a mounting portion are integrally formed therein, the spindle portion being inserted into the windup shaft, to which the other end of the biasing member is fixed, the mounting portion being continuous from a proximal end side of the spindle portion and being mounted at the predetermined position of the vehicle; and the rotation restricting portion and the rotation releasing portion are formed in the spindle portion such that the rotation releasing portion is adjacent to the mounting portion side of the rotation restricting portion.

According to a fifth aspect, in the sunshade device of the fourth aspect: the rotation releasing portion is a recess formed along a peripheral direction in an outer peripheral portion of the spindle portion, and the rotation restricting portion is a groove portion that is continuous from a part of the recess and is formed helically in the outer peripheral portion of the spindle portion; and the restricted portion is a projection that projects toward the inside of the windup shaft, is disposed in the recess and the groove portion, and moves in the recess and the groove portion.

According to a sixth aspect, in the sunshade device of the fourth or fifth aspect, a length between a position at which one end portion of the biasing member is mounted to the windup shaft and a position at which the other end portion of the biasing member is mounted to the second support member is set to be longer than the natural length of the biasing member at least in a state in which the restricted portion is positioned in the rotation releasing portion.

Effects of the Invention

According to the sunshade device of the first aspect, the configuration is made such that the rotation restricting portion and the rotation releasing portion are formed to be adjacent to each other in the longitudinal direction of the windup shaft, and the windup shaft moves relative to the second support member in the longitudinal direction, to thereby restrict or release the rotation of the windup shaft relative to the second support member. That is, in order to release the biasing state of the biasing member, the windup shaft needs to move relative to the second support member in the longitudinal direction. This enables to maintain the biasing state of the biasing member more reliably.

According to the sunshade device of the second aspect, the configuration is made such that the restricted portion moves between the rotation releasing portion and the rotation restricting portion relative thereto while rotating the windup shaft relative to the second support member. This makes it difficult to cause the restricted portion to move between the rotation releasing portion and the rotation restricting portion relative thereto in the case where, for example, the sunshade device is transported until the step of installing the sunshade device in a vehicle, which enables to maintain the biasing state of the biasing member more reliably.

According to the sunshade device of the third aspect, the configuration is made such that upon rotation of the windup shaft relative to the second support member by operating the stay so as to draw the sunshade, whereby the restricted portion moves from the rotation restricting portion to the rotation releasing portion relative thereto. This enables to easily release restrictions on the rotation of the windup shaft after the sunshade device is installed in a vehicle.

According to the sunshade device of the fourth aspect, the rotation restricting portion and the rotation releasing portion are formed in the spindle portion per se that is inserted into the windup shaft. Therefore, it is not required to separately provide a member for preventing rotation, which achieves a mechanism of maintaining the biasing state of the biasing member with a simpler configuration.

According to the sunshade device of the fifth aspect, the restricted portion projecting toward the inside of the windup shaft is configured so as to move in the recess serving as the rotation releasing portion formed in the outer peripheral portion of the spindle portion of the second support member and the groove portion serving as the rotation restricting portion relative thereto. That is, the mechanism part that restricts and releases the rotation of the windup shaft relative to the second support member is unlikely to come into contact with the outside, which makes it difficult to release the biasing state of the biasing member in the case where, for example, the sunshade device is transported until the step of installing the sunshade in a vehicle.

According to the sunshade device of the sixth aspect, the second support member is biased so as to move toward the center side of the windup shaft by the biasing force of the biasing member, which causes the restricted portion to stay in the rotation releasing portion more reliably in the state in which the sunshade device is used after being installed in a vehicle and prevents the rotation of the windup shaft from being restricted while the sunshade device is used. In addition, it is possible to prevent the windup shaft and the second support member from rattling in the longitudinal direction of the windup shaft, which prevents the generation of an unusual sound.

EMBODIMENTS FOR CARRYING OUT THE INVENTION

Hereinafter, a sunshade device according to an embodiment is described.

<1. Configuration of Sunshade Device>

Figure 1:
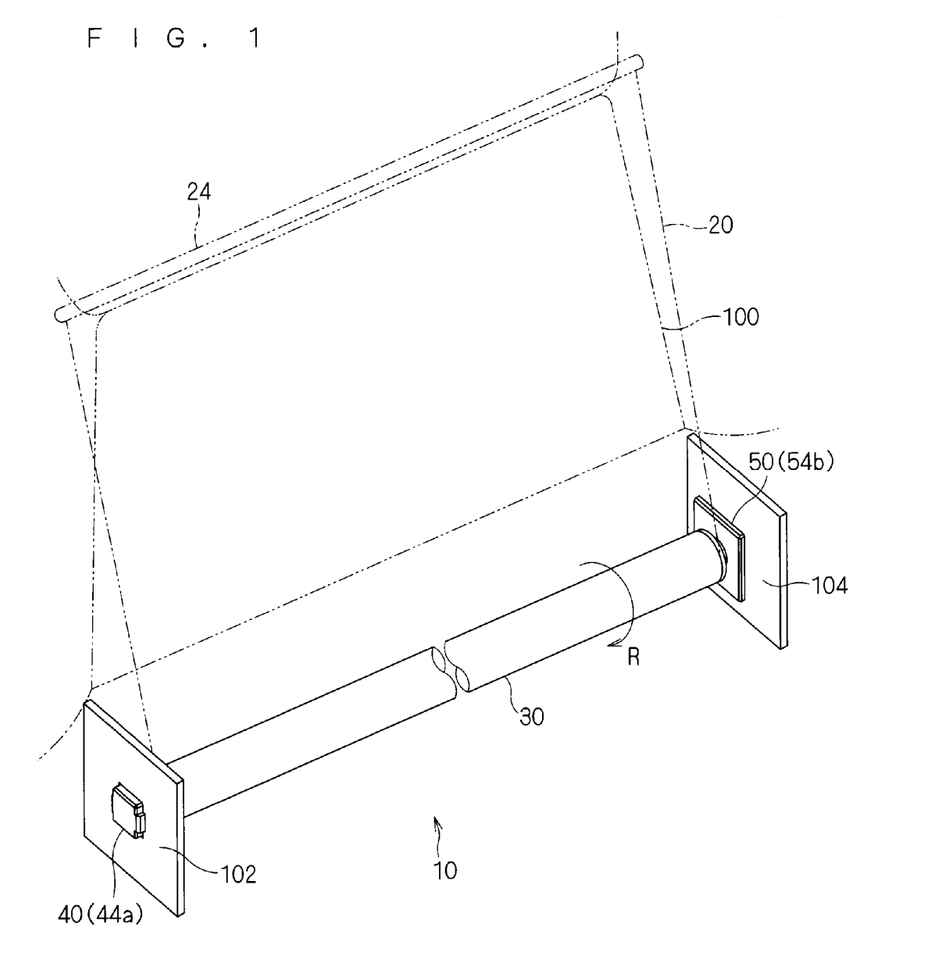
FIG. 1 is a perspective view showing an overall configuration of a sunshade device.
Figure 2:
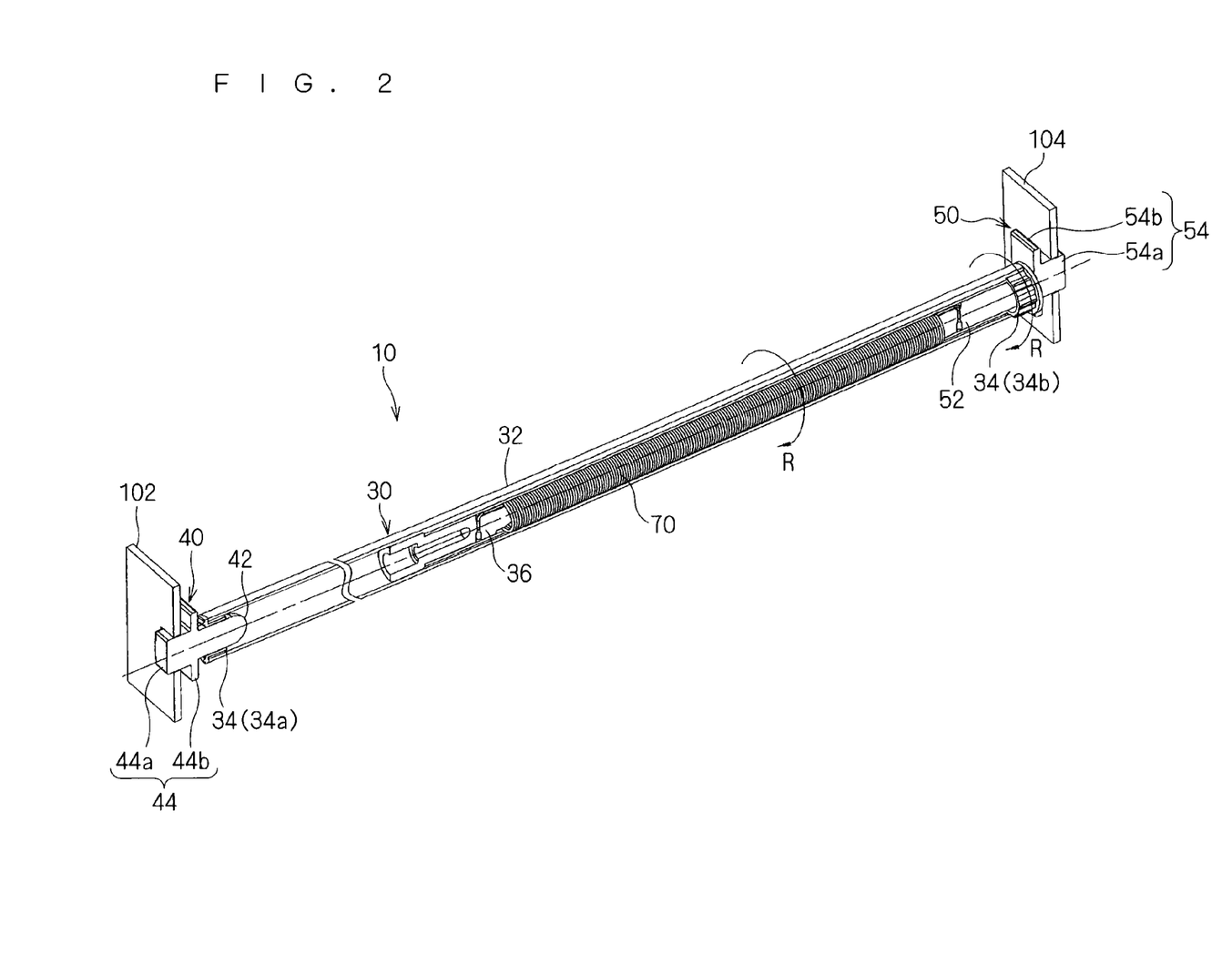
FIG. 2 is a partial cross-sectional perspective view showing the overall configuration of the sunshade device.

First, the configuration of a sunshade device 10 is described (see FIG. 1 and FIG. 2). The sunshade device 10 is a device for shading a window 100 of a vehicle. For example, the sunshade device 10 is applicable to various windows such as a door window, rear window and sunroof of a vehicle.

The sunshade device 10 includes a sunshade 20, a stay 24, a windup shaft 30, a first support member 40, a second support member 50 and a biasing member 70. Schematically, in the sunshade device 10, the sunshade 20 is mounted to the windup shaft 30 whose both ends are supported by the first support member 40 and the second support member 50 so as to rotate relative thereto. The ends of the biasing member 70 are fixed to the windup shaft 30 and the second support member 50, and the windup shaft 30 is configured to be pivotally biased against the second support member 50 in the windup direction of the sunshade 20 by the biasing member 70.

In the used state after being installed in a vehicle, the sunshade device 10 is maintained in the state of being pivotally biased such that the windup shaft 30 winds up the sunshade 20 by the biasing member 70. In this case, the sunshade device 10 is transferred to the step of installing the sunshade device 10 in a vehicle in the state in which the biasing member 70 is provided with a pivotal biasing force for allowing the windup shaft 30 to windup the sunshade 20 before being installed in a vehicle. The sunshade device 10 is configured so as to maintain the biasing state of the biasing member 70 independently before being installed in a vehicle.

The sunshade 20 is a sheet-like member (see FIG. 1) formed by, for example, cutting and sewing a material such as a mesh fabric or a resin sheet in accordance with the shape and size of the target window 100 (not shown). It suffices that the sunshade 20 is formed of a member that can shade the light entering through the window 100 of a vehicle. Description is given here of an example in which the sunshade 20 is formed into an approximately rectangular shape.

The stay 24 is attached to one edge of the sunshade 20 (see FIG. 1). The stay 24 is a member formed of a resin or the like into a long rod shape, which is attached along one edge of the sunshade 20. It suffices that the stay 24 has a strength enough to support one edge of the sunshade 20 for preventing slack thereof (in this case, approximately linearly).

The windup shaft 30 is formed into an approximately cylindrical shape in its entirety and includes a main body 32 and bearing portions 34 (see FIG. 2). The main body 32 is a member formed into an approximately elongated cylindrical shape. The other edge of the sunshade 20 is fixed to a part on the outer peripheral surface of the main body 32 along the longitudinal direction. The sunshade 20 whose other end is fixed to the windup shaft 30 is wound around the windup shaft 30. The bearing portions 34 are formed into an approximately cylindrical shape and are fixed to ends of the main body 32. More specifically, the bearing portions 34 are fixed in the state of respectively being fitting in the ends of the main body 32, in positions in which they are approximately concentric with the main body 32. The bearing portions 34 (first bearing portion 34a and second bearing portion 34b) are members serving as bearings for the first support member 40 and the second support member 50, respectively. In this case, the outer peripheral portion of the bearing portion 34 is formed to have a larger diameter than the distal-end-side part thereof such that the distal-end-side part of the bearing portion 34 can be fitted in the windup shaft 30 and the proximal-end-side part thereof abuts against the end of the windup shaft 30.

The windup shaft 30 further includes a fixing member 36 for fixing one end of the biasing member 70. The fixing member 36 is fixed to the main body 32 at a middle position in the longitudinal direction thereof so as not to rotate and move relative thereto.

Needless to say, the windup shaft 30 may not include the bearing portions 34 and may be configured such that the main body 32 is supported directly by the first support member 40 and the second support member 50. Alternatively, the windup shaft 30 may not include the fixing member 36 and may be configured such that one end of the biasing member 70 is fixed directly to the inner peripheral portion of the main body 32.

The ends of windup shaft 30 are supported by the first support member 40 and the second support member 50 such that the windup shaft 30 rotates relative thereto (see FIG. 2). That is, the windup shaft 30 is rotated relative to the first support member 40 and the second support member 50, to thereby allow the sunshade 20 to be drawn therefrom and housed therein.

The first support member 40 is configured to support one end of the windup shaft 30 so as to rotate relative thereto and move relative thereto along the longitudinal direction of the windup shaft 30, and to be mounted at a predetermined position of a vehicle. The first support member 40 has a configuration in which a first spindle portion 42 and a first mounting portion 44 are integrally formed by, for example, molding.

The first spindle portion 42 is formed into an approximately cylindrical shape so as to be inserted into one end of the windup shaft 30. More specifically, the first spindle portion 42 is inserted into the bearing portion 34 (first bearing portion 34a) on the one end side of the windup shaft 30. In this case, the first spindle portion 42 is set to a cross-sectional shape slightly smaller than the cross-sectional shape of the inner peripheral portion of the first bearing portion 34a. The first spindle portion 42 is configured so as to rotate relative to the windup shaft 30 about an axis and move relative thereto in an axis direction in the state in which the outer peripheral surface thereof is in surface contact with the inner peripheral surface of the first bearing portion 34a.

The first mounting portion 44 is formed to be continuous from the proximal end portion of the first spindle portion 42 and is configured so as to be mounted to a predetermined position of a vehicle. More specifically, the first mounting portion 44 is formed so as to be mounted to a trim, pillar, rear tray, roof or the like in accordance with the window 100 to which the sunshade device 10 is applied. That is, the first mounting portion 44 is mounted to a one-side mounting position 102 of the mounting positions corresponding to one side of the window 100. The mounting positions 102 and 104 to a vehicle are partially indicated by solid lines for the sake of convenience in FIG. 1 and FIG. 2, which are part of the trim, pillar, rear tray, roof or the like in the vicinity of the target window 100.

Applicable as the first mounting portion 44 is a configuration in which, for example, a distal end portion 44a formed into an approximately rectangular shape in cross section and a proximal end portion 44b larger than the distal end portion 44a are provided such that the distal end portion 44a is fitted in a hole, recess or the like having an approximately rectangular shape formed at the one-side mounting position 102 and that the proximal end portion 44b is mounted through abutment against the hole, recess or the like of the one-side mounting position 102. Note that, for example, a pawl portion that can be anchored to the one-side mounting position 102 may be formed at the distal end portion 44a of the first mounting portion 44. Accordingly, in its entirety, the first support member 40 is not allowed to rotate relative to the one-side mounting position 102, and the movement thereof is restricted in the axis direction of the first spindle portion 42. Needless to say, the configuration of the first mounting portion 44 is not limited to the above-mentioned configuration, and may be made so as to be mounted to the one-side mounting position 102 to restrict the rotation relative thereto and movement relative thereto, in accordance with the shape thereof.

That is, in its entirety, the first support member 40 is configured so as to support one end of the windup shaft 30 at the one-side mounting position 102 of the vehicle such that the one end rotates about the axis of the first spindle portion 42 relative thereto and moves in the axis direction relative thereto.

The second support member 50 is configured so as to support the other end of the windup shaft 30 to rotate relative thereto and move relative thereto along the longitudinal direction of the windup shaft 30, and so as to be mounted at a predetermined position (the other-end-side mounting position 104) of a vehicle. The second support member 50 has a similar configuration to that of the first support member 40, and thus, a similar configuration is described in a simplified manner. The second support member 50 has a configuration in which a second spindle portion 52 and a second mounting portion 54 including a distal end portion 54a and a proximal end portion 54b are integrally formed. That is, in its entirety, the second support member 50 is configured so as to support the other end of the windup shaft 30 at the other-side mounting position 104 of the vehicle such that the other end rotates relative thereto about the axis of the second spindle portion 52 and moves relative thereto in the axis direction.

The distal-end-side part of the second spindle portion 52 of the second support member 50 is formed so as to fix the other end of the biasing member 70. Further, as the configuration different from that of the first support member 40, the second support member 50 includes a rotation restricting portion 62 and a rotation releasing portion 66. The configurations of the rotation restricting portion 62 and rotation releasing portion 66 are described in detail together with the description of the mechanism for maintaining the biasing state of the biasing member 70.

One end of the biasing member 70 is fixed directly or indirectly to the windup shaft 30, while the other end thereof is disposed to be fixed to the second support member 50 (see FIG. 2). More specifically, one end of the biasing member 70 is fixed to the fixing member 36 of the windup shaft 30 in the state of being inserted into and disposed in the windup shaft 30. Meanwhile, the other end of the biasing member 70 is fixed to the tip of the second spindle portion 52 of the second support member 50 that is inserted into and disposed in the other end of the windup shaft 30. In this case, the biasing member 70 is a coil spring. Needless to say, the biasing member 70 is not limited to a coil spring and may be a plate spring (spiral spring) or the like as long as the windup shaft 30 can be pivotally biased against the second support member 50 in a windup direction R.

The windup shaft 30 needs to be pivotally biased in the windup direction R so as to draw and house the sunshade 20 therefrom and therein in the state in which the sunshade device 10 is installed in a vehicle. More specifically, it is preferable that the windup shaft 30 be pivotally biased in the windup direction R by the biasing member 70 in the state between the state in which the sunshade 20 is completely drawn and the state in which the sunshade 20 is completely wound up. In this case, the sunshade device 10 is configured such that the windup shaft 30 is rotated relative to the second support member 50 in advance to provide a biasing force to the biasing member 70 for allowing the windup shaft 30 to wind up the sunshade 20 and that the biasing state is maintained between the windup shaft 30 and the second support member 50. That is, in the state of winding up the sunshade 20, the windup shaft 30 is configured so as to restrict the rotation relative to the second support member 50 in the state of being rotated relative to the second support member 50 to provide a pivotal biasing force to the biasing member 70. This configuration is specifically described below.

The windup shaft 30 includes a restricted portion 38 at the other end thereof. The second support member 50 includes the rotation restricting portion 62 that restricts the operation of the restricted portion 38 and does not allow the windup shaft 30 to rotate relative thereto and the rotation releasing portion 66 that releases restrictions on the operation of the restricted portion 38 and allows the windup shaft 30 to rotate relative thereto, which are formed to be adjacent to each other in the longitudinal direction of the windup shaft 30 (see FIG. 4). Then, the restricted portion 38 moves between the rotation restricting portion 62 and the rotation releasing portion 66 upon the movement of the windup shaft 30 relative to the second support member 50 in the longitudinal direction, to thereby restrict or release the rotation of the windup shaft 30 relative to the second support member 50.

Figure 3:
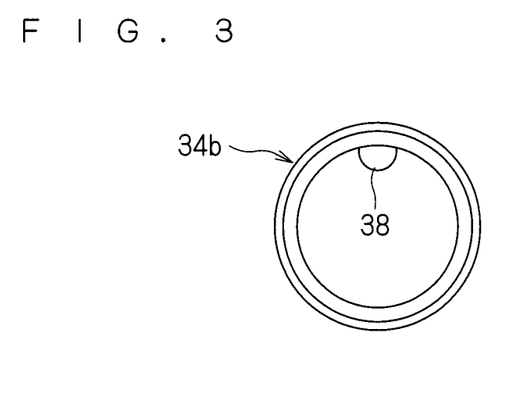
FIG. 3 is a schematic front view showing a second bearing portion.

More specifically, the restricted portion 38 is a projection formed so as to project toward the inside of the windup shaft 30 (see FIG. 3). The restricted portion 38 is a projection formed into an approximately hemispherical shape (including a cylindrical shape with an approximately-hemispherical-shaped tip). In this case, the restricted portion 38 is integrally formed with the second bearing portion 34b so as to project from the inner peripheral surface of the second bearing portion 34b toward the inside in the radiation direction thereof. FIG. 3 is a view showing the second bearing portion 34b from the middle portion side of the windup shaft 30 of FIG. 2. In this case, the restricted portion 38 is formed at the part of the second bearing portion 34b on the other-end-side part of the windup shaft 30. Needless to say, in a case where the second bearing portion 34b is omitted in the windup shaft 30, the restricted portion 38 may be formed so as to project from the inner peripheral surface of the main body 32 toward the inside thereof. The restricted portion 38 may be various projections having an approximately cylindrical shape, approximately polygonal column shape and approximately conical shape, not limited to a projection having an approximately hemispherical shape. The restricted portion 38 is disposed in the rotation restricting portion 62 or rotation releasing portion 66 so as to move therein, as described below.

Figure 4:
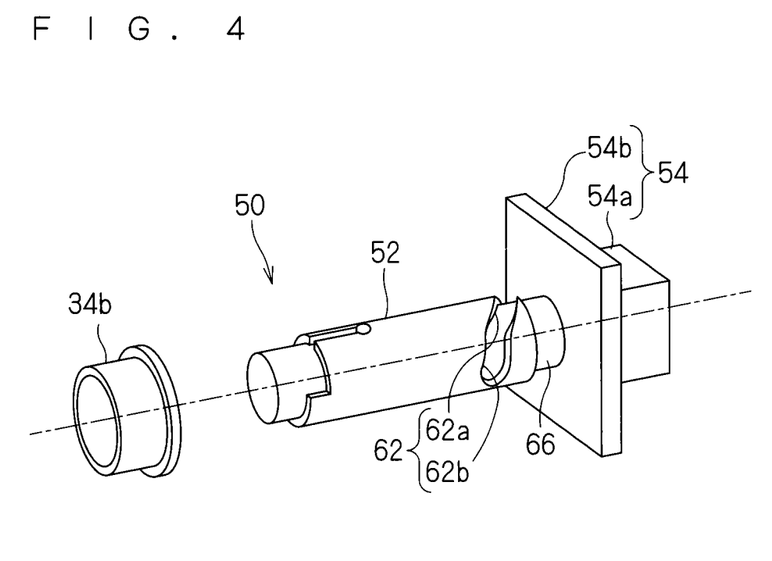
FIG. 4 is a perspective view showing a second support member.

The rotation restricting portion 62 and the rotation releasing portion 66 are formed in the second spindle portion 52 such that the rotation releasing portion 66 is adjacent to the second mounting portion 54 side of the rotation restricting portion 62 (see FIG. 4). More specifically, the rotation releasing portion 66 is a recess formed along the peripheral direction in the outer peripheral portion of the second spindle portion 52. That is, the part of the second spindle portion 52 in which the rotation releasing portion 66 is formed has a cylindrical shape smaller than other part. In this case, the rotation releasing portion 66 is formed at a position at which it is adjacent to the second mounting portion 54 (proximal end portion 54b). The rotation restricting portion 62 is a groove portion that is continuous from a part of the rotation releasing portion 66 and is formed helically in the outer peripheral portion of the second spindle portion 52. More specifically, the rotation restricting portion 62 is formed into a helical path in which the restricted portion 38 disposed in the rotation restricting portion 62 is guided toward the terminal end side and stays at the terminal end by the pivotal biasing force of the biasing member 70 that biases the windup shaft 30 in the windup direction R.

In this case, the rotation restricting portion 62 includes a first groove portion 62a inclined in the peripheral direction with respect to the outer peripheral portion of the second spindle portion 52 and a second groove portion 62b along the peripheral direction, which is formed helically in its entirety. That is, the first groove portion 62a is formed so as to be inclined toward the tip side of the second spindle portion 52 from a part in the peripheral direction of the rotation releasing portion 66 toward the windup direction R of the windup shaft 30, and the second groove portion 62b is formed from the tip of the first groove portion 62a toward the windup direction R and includes the terminal end.

Needless to say, the rotation restricting portion 62 may be formed helically to be inclined toward the tip side of the second spindle portion 52, toward the side opposite to the windup direction R of the windup shaft 30. In this case, it suffices that the rotation restricting portion 62 is formed so as to be anchored to the restricted portion 38 in such a manner that the windup shaft 30 does not rotate relative to the second support member 50 in the windup direction R by the pivotal biasing force of the biasing member 70 in the state in which the restricted portion 38 is located at the terminal end.

The rotation restricting portion 62 is not limited to the above-mentioned groove portion and may be formed in a stepwise shape along the helical path in its entirety. In this case, it is preferred that the rotation restricting portion 62 have a stepwise shape to have a step to such an extent that the restricted portion 38 moves smoothly between the entrance and the terminal end.

Figure 5:
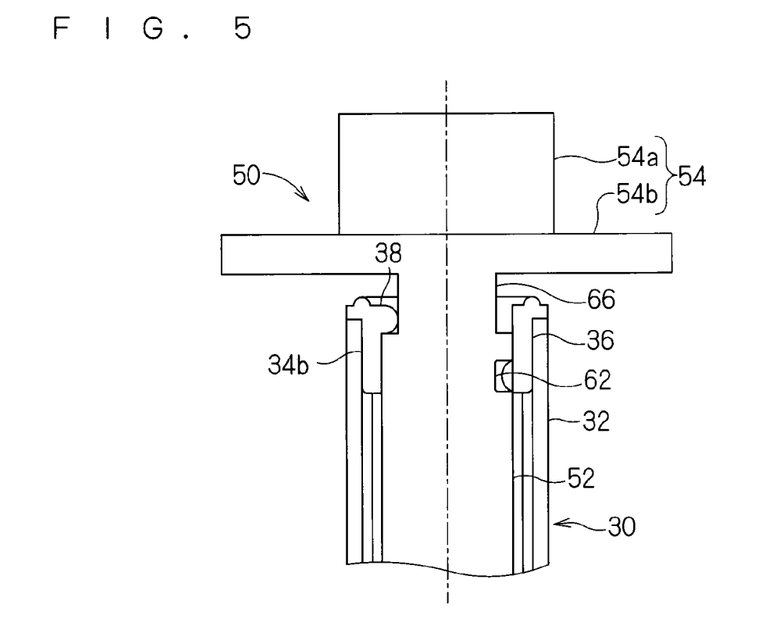
FIG. 5 is a cross-sectional view showing the other end of the sunshade device in a state in which the rotation thereof is released.
Figure 6:
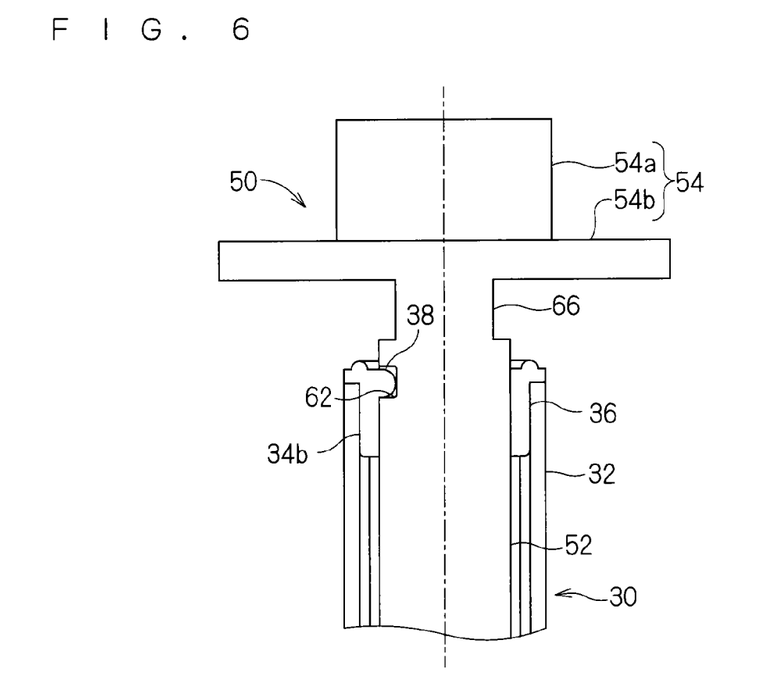
FIG. 6 is a cross-sectional view showing the other end of the sunshade device in a state in which the rotation thereof is restricted.

The rotation restricting portion 62 and the rotation releasing portion 66 are formed for allowing the restricted portion 38 to be disposed therein in the state in which the second spindle portion 52 is inserted into and disposed in the windup shaft 30 (second bearing portion 34b) (see FIG. 5 and FIG. 6). That is, the depth dimensions of the rotation restricting portion 62 and rotation releasing portion 66 are set to be larger (in this case, slightly larger) than the projecting dimension of the restricted portion 38 from the inner peripheral surface of the second bearing portion 34b. The depth dimensions of the rotation restricting portion 62 and rotation releasing portion 66 are set to be approximately identical to each other. The width dimensions of the rotation restricting portion 62 and rotation releasing portion 66 are set to be larger (in this case, the width dimension of the rotation restricting portion 62 is slightly larger) than the diameter of the restricted portion 38.

In the state in which the second spindle portion 52 is inserted into and disposed in the other end of the windup shaft 30, the restricted portion 38 is disposed in the rotation restricting portion 62 or the rotation releasing portion 66 so as to move between the rotation restricting portion 62 and the rotation releasing portion 66. More specifically, the restricted portion 38 moves between the rotation restricting portion 62 and the rotation releasing portion 66 relative thereto while causing the windup shaft 30 to rotate relative to the second support member 50.

In the state in which the restricted portion 38 is disposed in the rotation releasing portion 66, the restricted portion 38 is allowed to move in the rotation releasing portion 66 along the peripheral direction of the second spindle portion 52, and the windup shaft 30 is maintained so as to rotate relative to the second support member 50 (see FIG. 5). On this occasion, when the windup shaft 30 is rotated relative to the second support member 50 in a direction opposite to the direction in which the windup shaft 30 is desired to be biased for winding up, the biasing member 70 is twisted about the axis and is provided with a restoring force. That is, the biasing force for pivotally biasing the windup shaft 30 in the windup direction R can be provided to the biasing member 70.

When the restricted portion 38 is moved from the rotation releasing portion 66 to the rotation restricting portion 62 in this state, the restricted portion 38 is maintained in the state of abutting against the terminal end of the second groove portion 62b by the pivotal biasing force exerted on the windup shaft 30 by the biasing member 70 (see FIG. 6). As a result, the rotation of the windup shaft 30 is restricted in the direction in which the biasing force of the biasing member 70 on the second support member 50 is released. That is, the state in which the biasing member 70 biases the windup shaft 30 is maintained. In this manner, the restricted portion 38 is maintained in the rotation restricting portion 62 by the pivotal biasing force of the biasing member 70, which makes it difficult to release the biasing state and stabilizes the biasing state.

In a case where the restricted portion 38 moves from the rotation restricting portion 62 to the rotation releasing portion 66, the windup shaft 30 is required to rotate relative to the second support member 50 against the pivotal biasing force of the biasing member 70. The above-mentioned relative rotation causes the restricted portion 38 to move from the position at which the restricted portion 38 abuts against the terminal end of the second groove portion 62b of the rotation restricting portion 62 to the rotation releasing portion 66 through the first groove portion 62a. That is, it is only required to cause the windup shaft 30 to rotate relative to the second support member 50 in the direction against the pivotal biasing force in the windup direction R of the biasing member 70, which enables to cause the restricted portion 38 to move from the rotation restricting portion 62 to the rotation releasing portion 66 by the operation of drawing the sunshade 20.

The position of the second support member 50 in the longitudinal direction of the windup shaft 30 relative thereto differs between the state in which the restricted portion 38 is positioned in the rotation restricting portion 62 and the state in which the restricted portion 38 is positioned in the rotation releasing portion 66 (see FIG. 5 and FIG. 6). More specifically, the second spindle portion 34b comes out of the windup shaft 30 more in the state in which the restricted portion 38 is positioned in the rotation restricting portion 62 than the state in which the restricted portion 38 is positioned in the rotation releasing portion 66. In this case, the rotation releasing portion 66 comes out of the windup shaft 30 and is exposed to the outside in the state in which the restricted portion 38 is positioned in the rotation restricting portion 62. This enables to easily checking visually whether the windup shaft 30 that is pivotally biased by the biasing member 70 is in the state of restricting the rotation of the second support member 50 or the state of releasing the rotation of the second support member 50.

In this case, the windup shaft 30 and the second support member 50 are biased so as to become closer to each other by the biasing member 70. More specifically, the length between the position at which one end of the biasing member 70 is fixed to the windup shaft 30 and the position at which the other end of the biasing member 70 is fixed to the second support member 50 is set to be longer than the natural length of the biasing member 70 at least in the state in which the restricted portion 38 is positioned in the rotation releasing portion 66. That is, the biasing member 70 is disposed in the state of being extended more than the natural length in the longitudinal direction thereof, and a biasing force acts in the direction in which the biasing member 70 contacts. As a result, the restricted portion 38 is disposed at the position on the second mounting portion 54 side in the state of moving to the rotation releasing portion 66, and is maintained in the rotation releasing portion 66 so as not to move to the rotation restricting portion 62 in the state in which an external force is not exerted thereon.

It suffices that in the sunshade device 10 in a used state after being installed in a vehicle, the movement of the stay 24 is restricted such that the sunshade 20 is not wound up more from the state in which the sunshade 20 is housed. For example, it suffices that the stay 24 is configured to abut against the peripheral portion of the opening for drawing/housing the sunshade 20, which is formed in an interior member in the vicinity of the window 100.

<2. Operation of Sunshade Device>

Next, the operation of the sunshade device 10 is described by focusing on the operation before installment of the sunshade device 10 in a vehicle and to the installment thereof in the vehicle (see FIG. 7 to FIG. 10).

In the description below, the sunshade device 10 is in the initial state described below. The sunshade 20 is wound around the windup shaft 30. The restricted portion 38 is disposed in the rotation releasing portion 66 and is maintained in the state in which a pivotal biasing force is not provided to the biasing member 70. In this state, the windup shaft 30 and the second support member 50 are biased in the state of becoming closer to each other by the biasing force of the biasing member 70, and the restricted portion 38 is disposed on the second mounting portion 54 side of the rotation releasing portion 66 (see FIG. 7).

First, the operation before the sunshade device 10 is installed in a car body is described. The operator causes the windup shaft 30 to rotate relative to the second support member 50 while maintaining the restricted portion 38 in the rotation releasing portion 66. The direction of the relative rotation is the direction (direction in which the windup shaft 30 rotates when the sunshade 20 is drawn) opposite to the windup direction R of the sunshade 20 fixed to the windup shaft 30 (see FIG. 1 and FIG. 2). After rotating relative to the second support member 50 by a set amount, the windup shaft 30 is held so as to prevent the relative rotation of the windup shaft 30 and the second support member 50. In this case, the set amount of the relative rotation is an amount for allowing the windup shaft 30 to be pivotally biased to such an extent that the sunshade 20 is wound up and biased between the drawn state and the housed state, which may be determined in accordance with, for example, the drawing length of the sunshade 20 and the diameter of the windup shaft 30.

The operator causes the windup shaft 30 to rotate relative to the second support member 50 by a set amount, and then, causes the windup shaft 30 to move and rotate relative to the second support member 50 such that the restricted portion 38 moves from the rotation releasing portion 66 to the rotation restricting portion 62. To specifically describe the operations of the windup shaft 30 and the second support member 50, the windup shaft 30 is moved relative to the second support member 50 so as to be apart therefrom in the longitudinal direction, and the windup shaft 30 is rotated relative to the second support member 50 such that the restricted portion 38 is positioned to be opposed to the entrance of the first groove portion 62*a* of the rotation restricting portion 62 (see FIG. 8). Then, the windup shaft 30 is moved relative to the second support member 50 in a direction to be apart therefrom such that the restricted portion 38 moves into the rotation restricting portion 62. At the same time, the windup shaft 30 is rotated relative to the second support member 50 such that the restricted portion 38 is moved toward the terminal end of the rotation restricting portion 62 (in the windup direction R) (see FIG. 9). As a result, the restricted portion 38 passes through the first groove portion 62*a* and the second groove portion 62*b* to move to the position at which the restricted portion 38 abuts against the terminal end thereof (see FIG. 10). In this state, the windup shaft 30 is pivotally biased against the second support member 50 in the windup direction R by the pivotal biasing force of the biasing member 70, and the restricted portion 38 is pivotally biased against the terminal end of the rotation restricting portion 62.

Needless to say, the restricted portion 38 is moved into the first groove portion 62*a*, and then, the windup shaft 30 and the second support member 50 try to rotate relative thereto such that the restricted portion 38 moves toward the terminal end side of the rotation restricting portion 62 by the pivotal biasing force of the biasing member 70. Therefore, the operator may operate the windup shaft 30 and the second support member 50 in an auxiliary manner.

As a result, the windup shaft 30 and the second support member 50 are maintained in the biased state of being pivotally biased by the biasing member 70 such that the windup shaft 30 winds up the sunshade 20 (rotation restricted state). In this state, the sunshade device 10 is transferred to the step of installing the sunshade device 10 in a vehicle.

Next, description is given of the operation when the sunshade device 10 is installed in a vehicle. The operator mounts the first mounting portion 44 of the first support member 40 to the one-side mounting position 102 of a vehicle and mounts the second mounting portion 54 of the second support member 50 to the other-side mounting position 104 thereof (see FIG. 1 and FIG. 2). As a result, the sunshade device 10 is installed at a predetermined position of a vehicle.

In the state in which the sunshade device 10 is installed in a vehicle, the windup shaft 30 is caused to move and rotate relative to the second support member 50 in the longitudinal direction thereof such that the restricted portion 38 moves from the rotation restricting portion 62 to the rotation releasing portion 66. On this occasion, the biasing force (contractive force) in the longitudinal direction of the biasing member 70 acts to aid the operation in which the restricted portion 38 moves from the rotation restricting portion 62 to the rotation releasing portion 66. In actuality, the operator operates the stay 24 to draw the sunshade 20, so that the windup shaft 30 rotates and moves relative to the second support member 50. Accordingly, the restricted portion 38 moves from the rotation restricting portion 62 to the rotation releasing portion 66. More specifically, along with the operation of drawing the sunshade 20, the windup shaft 30 rotates relative to the second support member 50 toward the direction opposite to the windup direction R and moves relative thereto so as to become closer thereto in the longitudinal direction of the windup shaft 30. This causes the restricted portion 38 to pass through the first groove portion 62*a* (see FIG. 9) from the position at which the restricted portion 38 abuts against the terminal end of the second groove portion 62*b* (see FIG. 10), depart from the rotation restricting portion 62 and move into the rotation releasing portion 66 (see FIG. 8).

Figure 7:
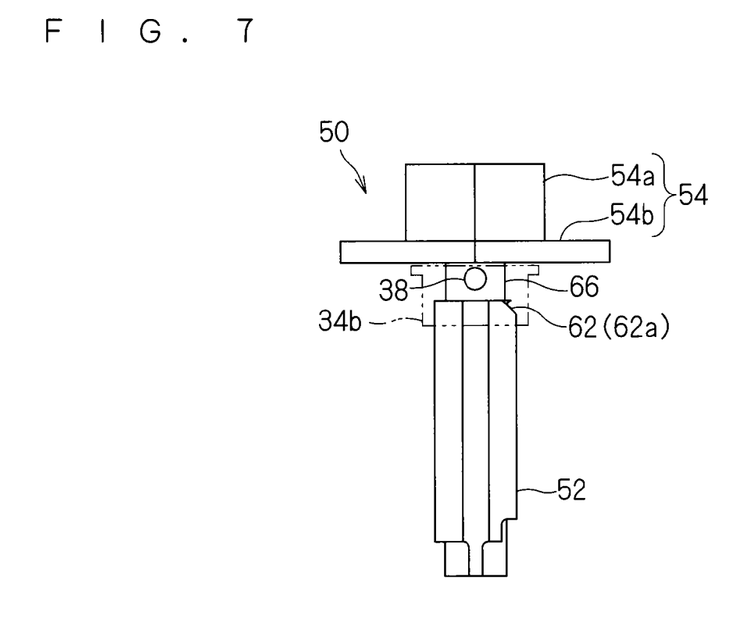
FIG. 7 is a view showing a relative rotation operation of the second bearing portion and the second support member.
Figure 8:
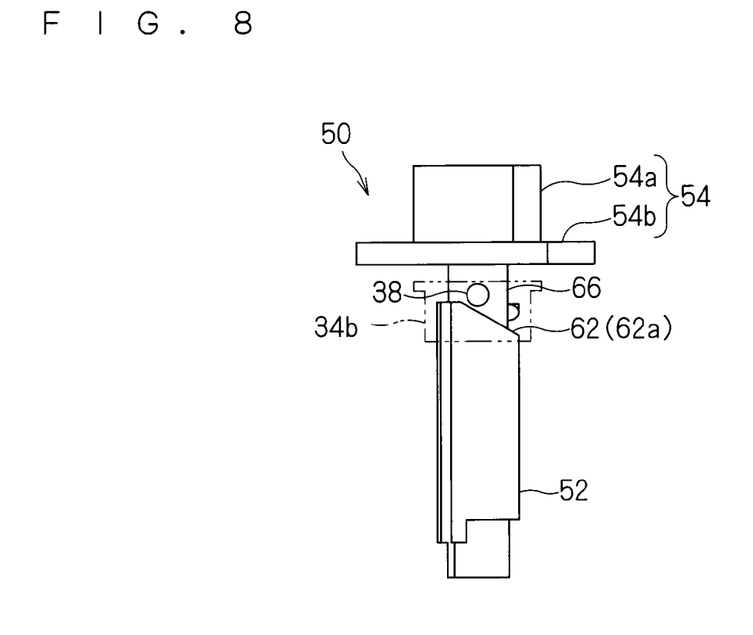
FIG. 8 is a view showing the relative rotation operation of the second bearing portion and the second support member.
Figure 9:
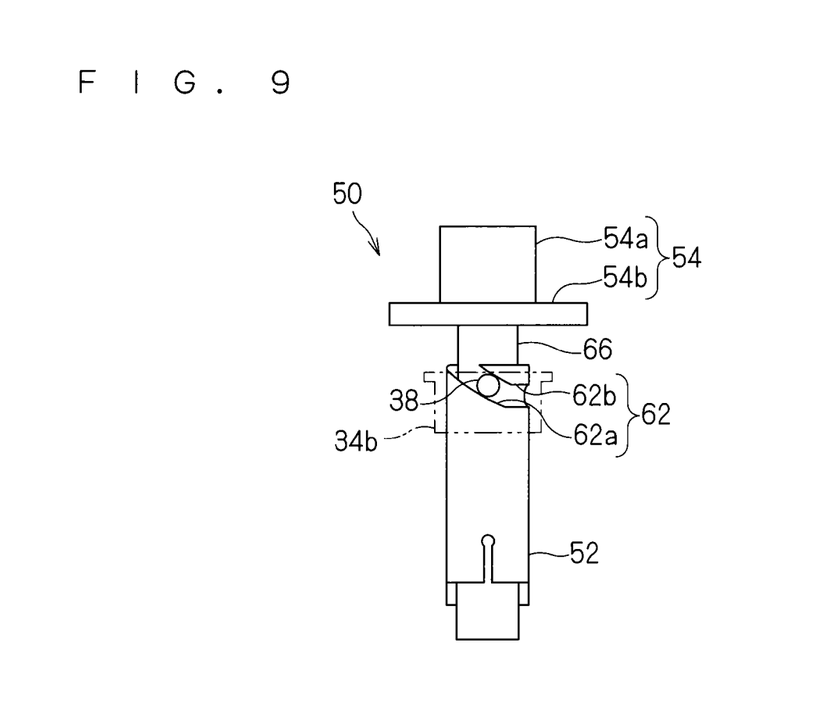
FIG. 9 is a view showing the relative rotation operation of the second bearing portion and the second support member.
Figure 10:
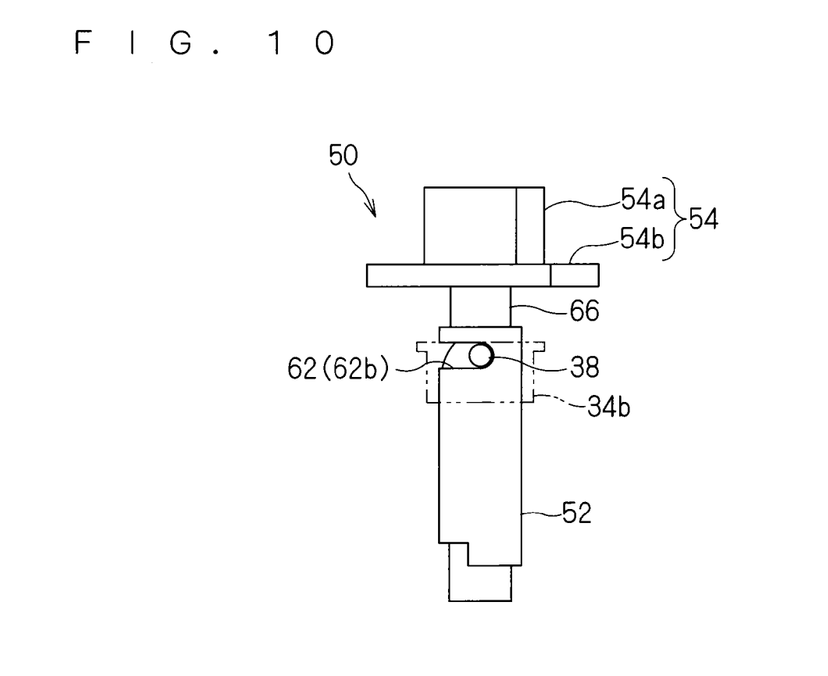
FIG. 10 is a view showing the relative rotation operation of the second bearing portion and the second support member.

After the restricted portion 38 departs from the rotation restricting portion 62, the windup shaft 30 is moved relative to the second support member 50 toward the second mounting portion 54 side by the biasing force in the longitudinal direction of the biasing member 70, so that the restricted portion 38 is disposed on the second mounting portion 54 side of the rotation releasing portion 66 (see FIG. 7). The windup shaft 30 rotates relative to the first support member 40 and moves relative thereto in the direction so as to become closer thereto.

This enables the windup shaft 30 to rotate relative to the second support member 50 in the state of being pivotally biased against thereto in the windup direction R by the biasing member 70. This state is the used state (rotation released state) of the sunshade device 10.

Then, the sunshade device 10 allows the sunshade 20 to be drawn from and housed into the windup shaft 30 through the operation of the stay 24, to thereby shade the window 100 that is an application target in the state where the sunshade 20 is drawn.

According to the sunshade device 10 configured as described above, the configuration is made such that the rotation restricting portion 62 and the rotation releasing portion 66 are formed to be adjacent to each other in the longitudinal direction of the windup shaft 30, and the windup shaft 30 moves relative to the second support member 50 in the longitudinal direction, to thereby restrict or release the rotation of the windup shaft 30. This achieves the mechanism for maintaining the biasing state of the biasing member 70 with a simple configuration. Further, it is possible to easily discriminate between the rotation restricted state and the rotation released state by visually checking the position of the windup shaft 30 in the longitudinal direction with respect to the second support member 50.

The configuration is made such that the restricted portion 38 moves between the rotation restricting portion 62 and the rotation releasing portion 66 relative thereto while moving and rotating the windup shaft 30 relative to the second support member 50. This makes it difficult for the restricted portion 38 to move between the rotation restricting portion 62 and the rotation releasing portion 66 relative thereto in a case where, for example, the sunshade device is transported until the step of installing a sunshade device in a vehicle, and accordingly, the biasing state of the biasing member 70 can be maintained more reliably.

In the state in which the restricted portion 38 is disposed in the rotation restricting portion 62, the windup shaft 30 is biased in the windup direction R, that is, the direction in which the restricted portion 38 is pressed against the terminal end of the rotation restricting portion 62 by the biasing member 70, which makes it difficult to release the biasing state of the biasing member 70.

The configuration is made such that through the operation of drawing the sunshade 20 performed on the stay 24, the windup shaft 30 is caused to rotate relative to the second support member 50 and the restricted portion 38 moves from the rotation restricting portion 62 to the rotation releasing portion 66 relative thereto. Accordingly, the restrictions on the rotation of the windup shaft 30 can be released easily when a sunshade device is installed in a vehicle.

The rotation restricting portion 62 and the rotation releasing portion 66 are formed in the second spindle portion 52 per se that is inserted into the windup shaft 30. Accordingly, it is not required to separately provide a member for preventing rotation, which achieves the mechanism for maintaining the biasing state of the biasing member 70 with a simpler configuration.

The restricted portion 38 projecting toward the inside of the windup shaft 30 is configured to move in the recess serving as the rotation releasing portion 66 and the groove portion serving as the rotation restricting portion 62 that are formed in the outer peripheral portion of the second spindle portion 52 of the second support member 50, relative thereto. That is, the mechanism part of restricting and releasing the rotation of the windup shaft 30 relative to the second support member 50 is unlikely to come into contact with the outside, whereby the biasing state of the biasing member 70 is hard to be released in a case where, for example, a sunshade device is transported until the step of installing a sunshade device in a vehicle.

Through the provision of the second groove portion 62b formed along the peripheral direction, even if an external force is exerted on the windup shaft 30 and the second support member 50 in a direction in which they become relatively close to each other in the state in which the restricted portion 38 is positioned at the terminal end of the rotation restricting portion 62, the restricted portion 38 abuts against the side wall of the second groove portion 62b and the movement thereof is restricted. Accordingly, it is possible to more effectively prevent the biasing state of the biasing member 70 from being released before a sunshade device is installed in a vehicle.

The second support member 50 is biased so as to move toward the center side of the windup shaft 30 by the biasing force of the biasing member 70. Accordingly, the restricted portion 38 is allowed to stay in the rotation releasing portion 66 more reliably in the used state after a sunshade device is installed in a vehicle, and the rotation of the windup shaft 30 is prevented from being restricted while being used. Further, the windup shaft 30 and the second support member 50 are prevented from rattling in the longitudinal direction of the windup shaft 30, which prevents the generation of an unusual sound.

While the sunshade device 10 has been described above in detail, the foregoing description is in all aspects illustrative, and the present invention is not limited thereto. That is, numerous modifications and variations can be devised in the described aspects without departing from the scope of the invention.

DESCRIPTION OF REFERENCE NUMERALS

| | |
|---|---|
| 10 | sunshade device |
| 20 | sunshade |
| 24 | stay |
| 30 | windup shaft |
| 32 | main body |
| 38 | restricted portion |
| 40 | first support member |
| 50 | second support member |
| 52 | second spindle portion |
| 54 | second mounting portion |
| 62 | rotation restricting portion |
| 66 | rotation releasing portion |
| 70 | biasing member |

The invention claimed is:

1. A sunshade device for shading a window of a vehicle, comprising:
a sunshade;
a stay to which one edge of said sunshade is fixed;
a hollow windup shaft to which the other edge of said sunshade is fixed;
a first support member supporting one end of said windup shaft to rotate relative thereto and move relative thereto in a longitudinal direction of said windup shaft, and mounted at a predetermined position of said vehicle;
a second support member supporting the other end of said windup shaft to rotate relative thereto and move relative thereto in the longitudinal direction of said windup shaft, and mounted at another predetermined position of said vehicle; and
a biasing member configured to pivotally bias said windup shaft against said second support member in the windup direction of said sunshade, wherein:
said windup shaft includes a restricted portion at the other end thereof;
said second support member includes a rotation restricting portion and a rotation releasing portion formed to be adjacent to each other in the longitudinal direction of said windup shaft, said rotation restricting portion restricting the operation of said restricted portion so as not to allow the rotation of said windup shaft relative thereto, said rotation releasing portion releasing the operation of said restricted portion so as to allow the rotation of said windup shaft relative thereto; and
said windup shaft moves relative to said second support member in the longitudinal direction to restrict or release the rotation of said windup shaft,
wherein said second support member is configured such that a spindle portion and a mounting portion are integrally formed therein, said spindle portion being inserted into said windup shaft, to which the other end of said biasing member is fixed, said mounting portion being continuous from a proximal end side of said spindle portion and being mounted at said predetermined position of said vehicle;
wherein said rotation restricting portion and said rotation releasing portion are formed in said spindle portion such that said rotation releasing portion is adjacent to said mounting portion side of said rotation restricting portion,
wherein said rotation releasing portion is a recess formed along a peripheral direction in an outer peripheral portion of said spindle portion, and said rotation restricting portion is a groove portion that is continuous from a part of said recess and is formed helically in the outer peripheral portion of said spindle portion; and
wherein said restricted portion is a projection that projects toward the inside of said windup shaft, is disposed in said recess and said groove portion, and moves in said recess and said groove portion.

2. The sunshade device according to claim 1, wherein said restricted portion is configured to move, upon said windup shaft rotating relative to said second support member, between said rotation releasing portion and said rotation restricting portion relative thereto.

3. The sunshade device according to claim 1, wherein said restricted portion is configured so as to move from said rotation restricting portion to said rotation releasing portion relative thereto by an operation of drawing said sunshade.

4. The sunshade device according to claim 1, wherein a length between a position at which one end portion of said biasing member is mounted to said windup shaft and a position at which the other end portion of said biasing member is mounted to the second support member is set to be longer than the natural length of said biasing member at least in a state in which said restricted portion is positioned in said rotation releasing portion.

* * * * *